(12) United States Patent
Zacchera et al.

(10) Patent No.: US 10,871,108 B2
(45) Date of Patent: Dec. 22, 2020

(54) ORIENTATION FEATURE FOR SWIRLER TUBE

(71) Applicant: United Technologies Corporation, Farmington, CT (US)

(72) Inventors: Kevin Zacchera, Glastonbury, CT (US); Matthew Andrew Hough, West Hartford, CT (US); Jonathan Lemoine, South Hadley, MA (US); Christopher Treat, Manchester, CT (US); Alberto A. Mateo, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 238 days.

(21) Appl. No.: 16/011,737

(22) Filed: Jun. 19, 2018

(65) Prior Publication Data
US 2018/0298823 A1 Oct. 18, 2018

Related U.S. Application Data

(62) Division of application No. 14/617,109, filed on Feb. 9, 2015, now Pat. No. 10,030,582.

(51) Int. Cl.
F01D 5/08 (2006.01)
F02C 7/12 (2006.01)
F02C 7/20 (2006.01)

(52) U.S. Cl.
CPC ............... *F02C 7/20* (2013.01); *F01D 5/081* (2013.01); *F02C 7/12* (2013.01); *F05D 2230/64* (2013.01);
(Continued)

(58) Field of Classification Search
CPC ...... F01D 5/081; F01D 5/082; F05D 2260/14; F16B 2001/0092
See application file for complete search history.

(56) References Cited

U.S. PATENT DOCUMENTS 3,768,921 A 10/1973 Brown et al.
3,936,215 A 2/1976 Hoff
(Continued)

FOREIGN PATENT DOCUMENTS

WO 2014175969 A2 10/2014

OTHER PUBLICATIONS

European Search Report for European Application No. 16154790.6 dated Jul. 8, 2016.

Primary Examiner — Robert K Arundale
Assistant Examiner — Richard K. Durden
(74) Attorney, Agent, or Firm — Carlson, Gaskey & Olds, P.C.

(57) ABSTRACT

A cooling structure for a gas turbine engine comprises a gas turbine engine structure defining a cooling cavity. A cooling component is configured to direct cooling flow in a desired direction into the cooling cavity. A bracket supports the cooling component and has an attachment interface to fix the bracket to the gas turbine engine structure. A first orientation feature associated with the bracket. A second orientation feature is associated with the gas turbine engine structure. The first and second orientation features cooperate with each other to ensure that the cooling component is only installed in one orientation relative to the gas turbine engine structure. A gas turbine engine and a method of installing a cooling structure are also disclosed.

10 Claims, 4 Drawing Sheets

(52) U.S. Cl.
CPC ...... *F05D 2260/14* (2013.01); *F05D 2260/30* (2013.01); *F05D 2260/36* (2013.01); *Y02T 50/60* (2013.01)

(56) References Cited

U.S. PATENT DOCUMENTS

| | | |
|---|---|---|
| 4,292,008 A | 9/1981 | Grosjean et al. |
| 5,961,287 A | 10/1999 | Cairo |
| 6,234,746 B1 | 5/2001 | Schroder et al. |
| 6,283,712 B1 * | 9/2001 | Dziech ............ F01D 5/066 |
| | | 415/115 |
| 6,662,567 B1 | 12/2003 | Jorgensen |
| 6,884,023 B2 | 4/2005 | Dube et al. |
| 7,334,983 B2 | 2/2008 | Alvanos et al. |
| 7,677,048 B1 | 3/2010 | Brostmeyer et al. |
| 7,775,764 B2 | 8/2010 | Snowsill et al. |
| 7,874,803 B2 | 1/2011 | Whitton |
| 8,540,483 B2 | 9/2013 | Bintz et al. |
| 8,555,654 B2 | 10/2013 | Lewis et al. |
| 2003/0233834 A1 | 12/2003 | Boeck |
| 2006/0133894 A1* | 6/2006 | Bouru ............ F16B 1/00 |
| | | 403/373 |
| 2006/0275106 A1 | 12/2006 | Alvanos |
| 2007/0231134 A1 | 10/2007 | Kumar et al. |
| 2008/0253884 A1 | 10/2008 | Snyder et al. |
| 2011/0079019 A1 | 4/2011 | Durocher et al. |
| 2011/0123325 A1 | 5/2011 | Morris et al. |
| 2011/0189000 A1 | 8/2011 | Vedhagiri et al. |
| 2011/0247346 A1 | 10/2011 | Kimmel et al. |
| 2013/0280028 A1 | 10/2013 | Benjamin et al. |
| 2014/0159200 A1 | 6/2014 | Loke et al. |
| 2015/0291225 A1* | 10/2015 | Yao ............ B62D 27/065 |
| | | 296/203.01 |
| 2016/0201499 A1* | 7/2016 | Pudvah ............ F04D 29/563 |

* cited by examiner

ORIENTATION FEATURE FOR SWIRLER TUBE

RELATED APPLICATIONS

This application is a divisional of application Ser. No. 14/617,109 filed on Feb. 9, 2015.

BACKGROUND

The present disclosure relates generally to a gas turbine engine, and in particular to a swirler tube in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In pursuit of more efficient gas turbine engines, higher turbine inlet temperatures have been relied upon to boost overall engine performance. This results in increased gas path temperatures that may adversely affect component life. To address this issue, dedicated cooling air is extracted from a compressor section and is used to cool the gas path components in the turbine. For example, cooling air can be directed into a rotor cavity for cooling purposes. It is important to ensure that the cooling air is directed into the rotor cavity in a manner to provide the most effective cooling.

SUMMARY

In a featured embodiment, a cooling structure for a gas turbine engine comprises a gas turbine engine structure defining a cooling cavity. A cooling component is configured to direct cooling flow in a desired direction into the cooling cavity. A bracket supports the cooling component and has an attachment interface to fix the bracket to the gas turbine engine structure. A first orientation feature associated with the bracket. A second orientation feature is associated with the gas turbine engine structure. The first and second orientation features cooperate with each other to ensure that the cooling component is only installed in one orientation relative to the gas turbine engine structure.

In another embodiment according to the previous embodiment, one of the first and second orientation features comprises a male feature and the other of the first and second orientation features comprises a female feature that receives the male feature.

In another embodiment according to any of the previous embodiments, the male feature comprises a tab and the female feature comprises a slot.

In another embodiment according to any of the previous embodiments, the male feature comprises a pin and the female feature comprises an opening.

In another embodiment according to any of the previous embodiments, the first orientation feature comprises at least one tab and the second orientation feature comprises a rib. The rib interferes with the tab to prevent mounting the bracket in an incorrect orientation relative to the gas turbine engine structure.

In another embodiment according to any of the previous embodiments, the bracket comprises a forward bracket positioned on one side of the gas turbine engine structure and an aft bracket is positioned on an opposite side of the gas turbine engine structure. The cooling component is associated with the aft bracket. The forward and aft brackets each include the first orientation feature.

In another embodiment according to any of the previous embodiments, the gas turbine engine structure includes an opening to define a portion of a cooling flow path, and further includes an inlet tube associated with the forward bracket to direct cooling flow through the opening and into the cooling component.

In another embodiment according to any of the previous embodiments, the cooling component comprises a swirler tube that redirects cooling flow from a first direction defined by the inlet tube to a second direction that is transverse to the first direction.

In another embodiment according to any of the previous embodiments, the attachment interface includes at least one fastener that secures both the forward and aft brackets to the gas turbine engine structure.

In another embodiment according to any of the previous embodiments, the gas turbine engine structure comprises a mid-turbine frame structure.

In another embodiment according to any of the previous embodiments, the cooling component comprises a swirler tube.

In another featured embodiment, a gas turbine engine comprises a mid-turbine frame located axially between a first turbine and a second turbine. The mid-turbine frame includes an opening to define a portion of a cooling flow path into a rotor cavity. A cooling component is configured to direct cooling flow in a desired direction into the rotor cavity. A bracket assembly supports the cooling component and has an attachment interface to fix the bracket assembly to the mid-turbine frame. A first orientation feature is associated with the bracket assembly. A second orientation feature is associated with the mid-turbine frame. The first and second orientation features cooperate with each other to ensure that the cooling component is only installed in one orientation relative to the mid-turbine frame.

In another embodiment according to the previous embodiment, the opening in the mid-turbine frame defines a center axis. The cooling component comprises a swirler tube that directs cooling flow in a direction that is non-parallel with the center axis.

In another embodiment according to any of the previous embodiments, the bracket assembly comprises a forward bracket positioned at the opening on one side of the mid-turbine frame and an aft bracket positioned at the opening on an opposite side of the mid-turbine frame. The swirler tube is associated with the aft bracket.

In another embodiment according to any of the previous embodiments, the first orientation feature comprises at least one tab and the second orientation feature comprises a rib. The rib interferes with the tab to prevent mounting the bracket in an incorrect orientation relative to the mid-turbine frame.

In another embodiment according to any of the previous embodiments, the first orientation feature is formed on both the forward and aft brackets. The second orientation feature is formed on each side of the mid-turbine frame such that each of the forward and aft brackets can only be mounted on the mid-turbine frame in one mounting orientation.

In another featured embodiment, a method of installing a cooling structure in a gas turbine engine includes providing a gas turbine engine structure that defines a cooling cavity and a cooling component that is configured to direct cooling flow in a desired direction into the cooling cavity. A bracket configured to support the cooling component and to attach the bracket to the gas turbine engine structure is provided. A first orientation feature is formed on the bracket. A second orientation feature is formed on the gas turbine engine structure. The first and second orientation features are associated with each other to ensure that the cooling component is only installed in one orientation relative to the gas turbine engine structure.

In another embodiment according to the previous embodiment, one of the first and second orientation features comprises a male feature and the other of the first and second orientation features comprises a female feature, and includes inserting the male feature into the female feature to achieve the one orientation.

In another embodiment according to any of the previous embodiments, one of the first and second orientation features interferes with the other of the first and second orientation features to prevent improper installation.

In another embodiment according to any of the previous embodiments, the gas turbine engine structure comprises a mid-turbine frame and the cooling component comprise a swirler tube.

The foregoing features and elements may be combined in any combination without exclusivity, unless expressly indicated otherwise.

These and other features may be best understood from the following drawings and specification.

DETAILED DESCRIPTION

Figure 1:
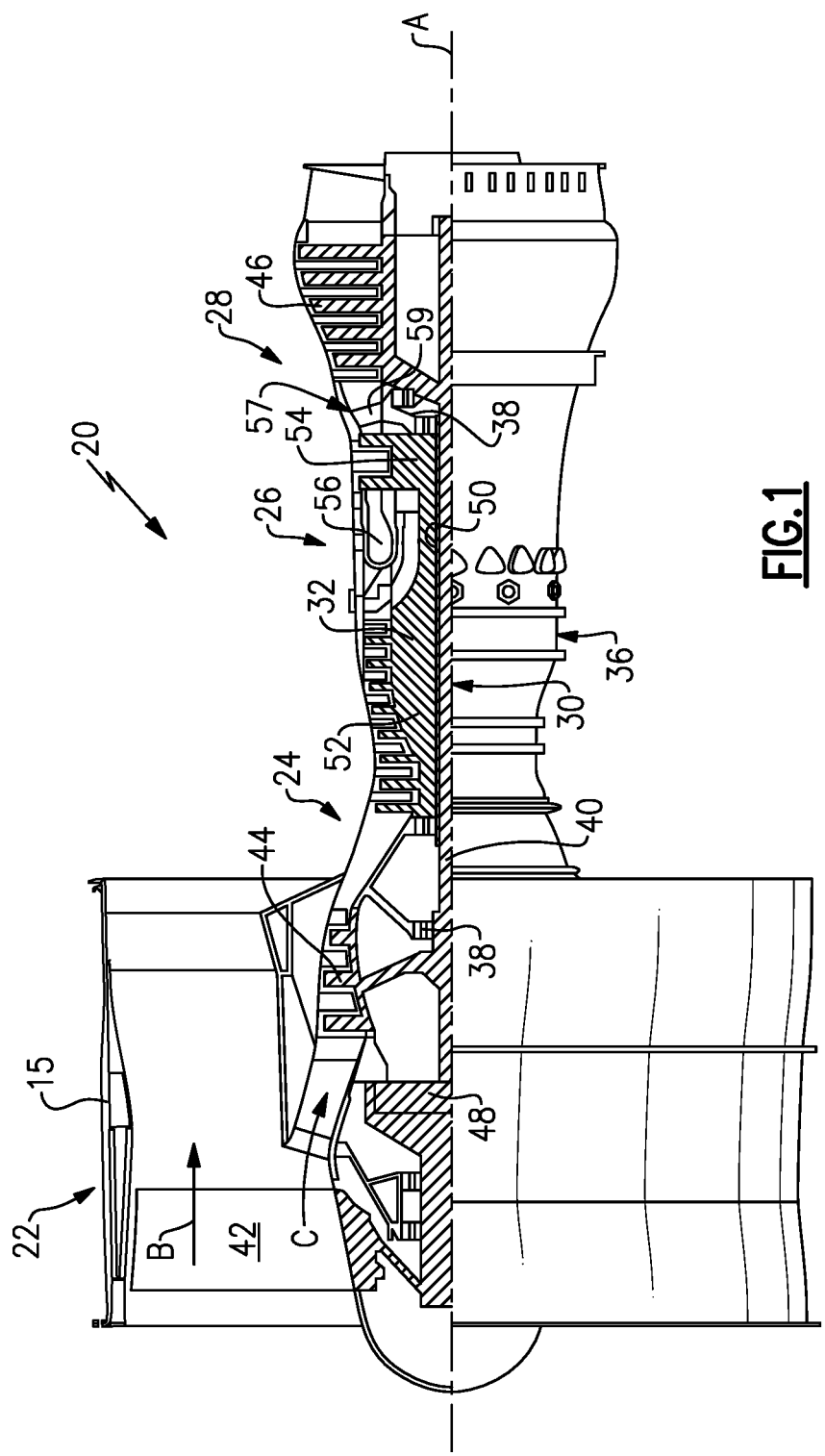
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,°\, R)/(518.7° \, R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
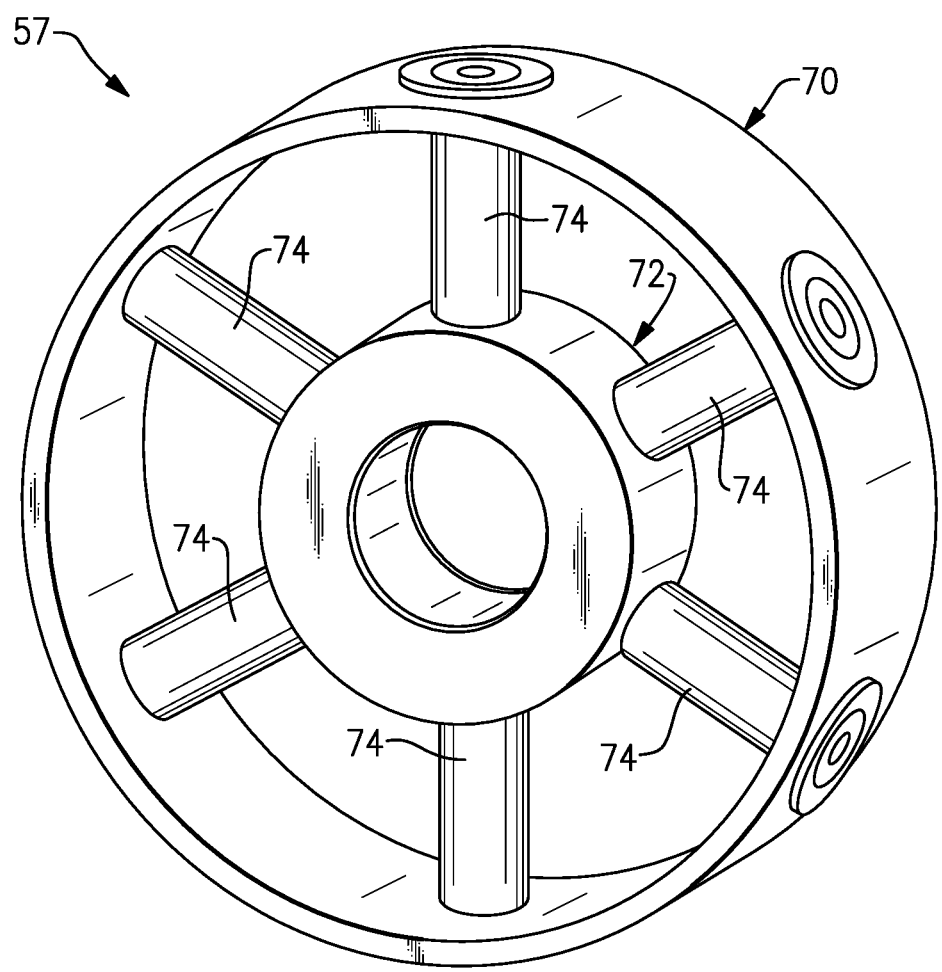
FIG. 2 is a schematic perspective view of an example mid-turbine frame in the gas turbine engine.

FIG. 2 is a schematic perspective view of one embodiment of the mid-turbine frame 57. The schematic view shown in FIG. 2 is a high level conceptual view and is intended to illustrate relative positioning of various components, but not the actual shape of various components. The mid-turbine frame 57 includes an outer frame case 70, an inner frame case 72, and a plurality of hollow spokes 74. In the example shown in FIG. 2, six hollow spokes 74 are distributed around the circumference of the inner frame case 72 to provide structural support between the inner frame case 72 and the outer frame case 70. In alternative embodiments, the mid-turbine frame 57 can have more or less than 6 hollow spokes. The inner frame case 72 supports the rotor assembly via the bearing systems 38 (shown in FIG. 1), and distributes the force from the inner frame case 72 to the outer frame case 70 via the plurality of hollow spokes 74 as known.

Figure 3A:
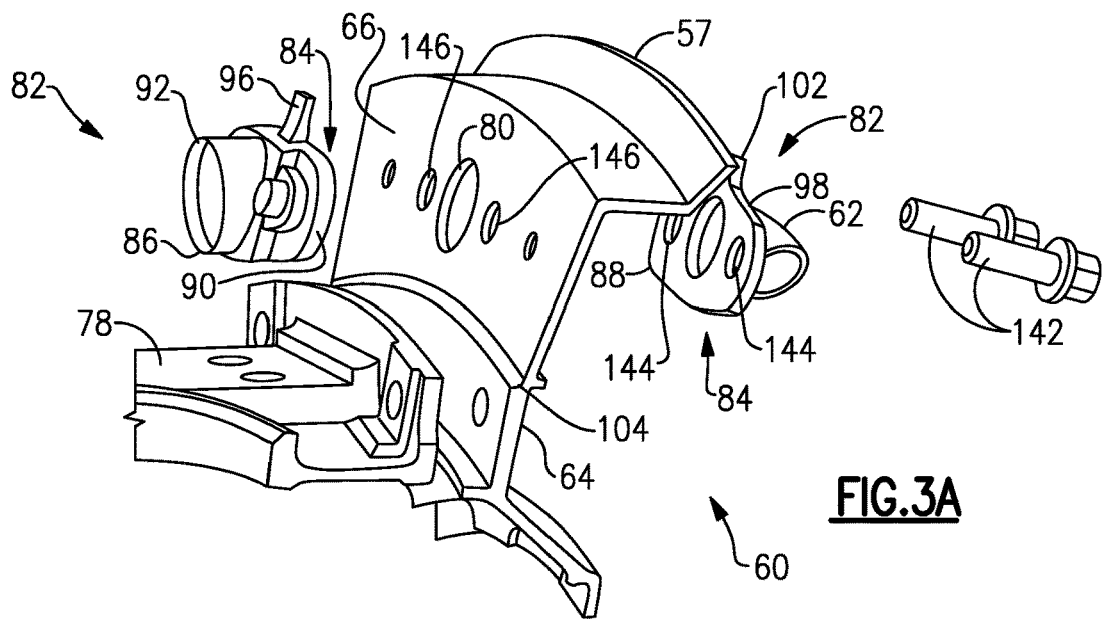
FIG. 3A is an exploded view of a mounting assembly for a swirler tube.

FIG. 3A shows a portion of the mid-turbine frame 57 through which cooling air is directed into a rotor cavity 60 via a swirler tube 62. The direction of entry of the cooling flow in the turbine is critical to ensure that the cooling flow is directed at the correct location. The subject invention provides a mistake-proof mounting configuration to ensure that the tube 62 is properly installed to direct cooling air as needed.

Any type of swirler tube 62 or other cooling structures can be used with the subject mounting configuration. One example of a swirler tube 62 is described in co-pending application having Ser. No. 14/617,594, which is assigned to the same assignee as the subject invention and which is hereby incorporated by reference. In this configuration, the swirler tube 62 directs the cooling airflow into the rotor cavity 60 in the direction of rotation of the low rotor to generate pre-swirling. By pre-swirling the cooling air flow prior to entering the rotor cavity 60, the heat-up of the cooling air flow is reduced which lowers a temperature of the rotor cavity 60.

As shown in FIG. 3A, the mid-turbine frame 57 includes a plate portion 64 having a forward face 66 and an aft face 68. The plate portion 64 of the mid-turbine frame 57 is attached to an engine inner case structure 78

The engine inner case structure 78 is secured to the forward face 66 of the plate portion 64. The plate portion 64 includes at least one opening 80 that is located radially outwardly relative to the inner case 78. The opening 80 extends through the entire thickness of the plate portion 64 to form a portion of the cooling flow path into the rotor cavity 60. A cooling structure, such as the swirler tube 62 for example, is associated with the opening 80 and is configured to direct cooling flow in a desired direction into the cooling cavity, e.g. rotor cavity 60.

A bracket assembly 82 supports the swirler tube 62 and includes an attachment interface 84 to fix the bracket assembly 82 to the mid-turbine frame 57. In the example shown, the bracket assembly 82 comprises a forward bracket 86 positioned on the forward face 66 and an aft bracket 88 positioned on the aft face 68 of the plate portion 64. The swirler tube 62 is associated with the aft bracket 88.

The forward bracket 86 comprises a mounting flange portion 90 that includes the attachment interface 84 and a center boss portion 92 that defines a portion of the cooling flow path into the opening 80 in the plate portion 64. The center boss portion 92 defines a center axis and is associated with an inlet tube 94 (FIG. 3B) that receives cooling air flow from the compressor section 24. A tab portion 96 extends outwardly from a peripheral edge of the mounting flange portion 90.

The aft bracket 88 comprises a mounting flange portion 98 that includes the attachment interface 84 and a center boss portion 100 that receives cooling flow from the opening 80 in the plate portion 64. The center boss portion 100 (FIG. 4) defines an opening and is associated with the swirler tube 62 that receives cooling air flow from the inlet tube 94. A tab portion 102 extends outwardly from a peripheral edge of the mounting flange portion 98.

The swirler tube 62 can be separately attached to the center boss portion 100, or the swirler tube 62 can be integrally formed with the aft bracket 88. The swirler tube 62 comprises a curved tube body 62a extends to a distal tip 62b from which cooling flow exits the tube 62. The cooling flow initially passes through the plate portion 64 in a first direction that is generally parallel with axial flow through the engine. The curved tube body 62a receives this flow and redirects the flow from this first direction defined by the inlet tube 94 to a second direction that is transverse to the first direction. In one example, the swirler tube 62 directs the cooling flow in a direction that is non-parallel with the central axis defined by the inlet tube 94 to initiate a swirling flow pattern about the central axis of the engine.

The plate portion 64 includes at least one first rib 104 extending outwardly from the forward face 66 and at least one second rib 106 (FIG. 4) extending outwardly from the aft face 68. The ribs 104, 106 are located radially outwardly of the inner case structure 78. The ribs 104, 106 comprise orientation features that cooperate with the tab portions 96, 102 of the forward 86 and aft 88 brackets to ensure that the swirler tube 62 is only installed in one orientation relative to the mid-turbine frame 57.

The tab portions 96, 102 comprise a first orientation feature that is associated with the bracket assembly 82 and the ribs 104, 106 comprise a second orientation feature that is associated with the gas turbine engine structure, e.g. the mid-turbine frame 57. These first and second orientation features cooperate with each other to prevent mis-assembly of the swirler tube 62 in the gas turbine engine.

Figure 3B:
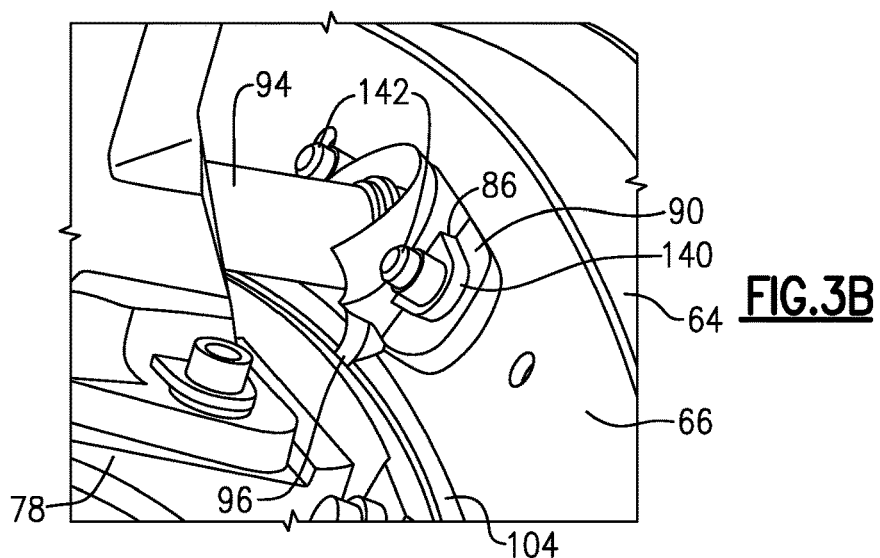
FIG. 3B is a magnified view of a forward bracket of the mounting assembly of FIG. 3A.
Figure 4:
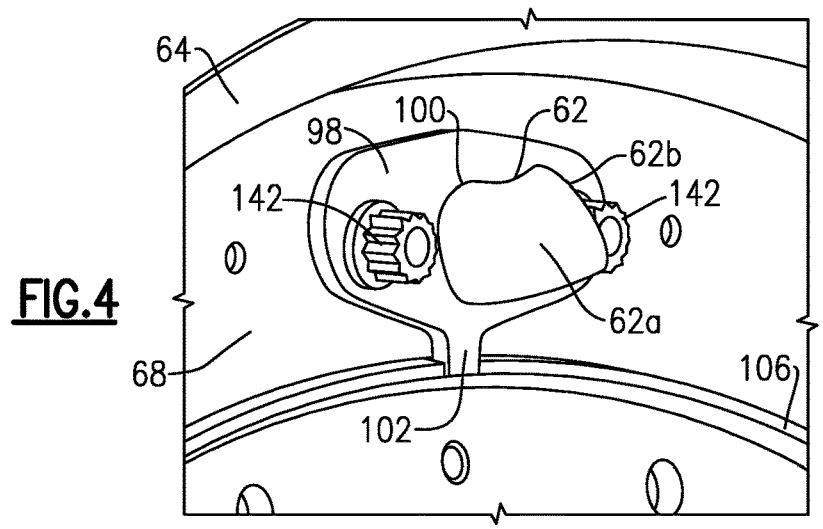
FIG. 4 is a magnified view of an aft bracket of the mounting assembly of FIG. 3A.

FIGS. 2-4 show one example of first and second orientations features; however, other types of features could also be used. For example, FIGS. 5-6 show different example configurations where one of the first and second orientation features comprises a male feature and the other of the first and second orientation features comprise a female feature that receives the male feature to ensure proper installation.

Figure 5:
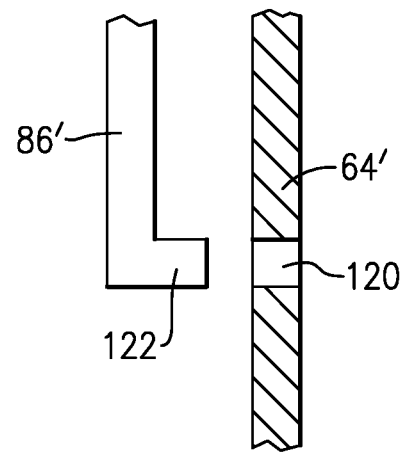
FIG. 5 is schematic view of an alternate orientation feature.

FIG. 5 shows an example where the plate portion 64' includes an opening, slot, or recess 120 that comprises a female feature. A forward bracket 86' includes a pin or hook portion 122 that extends outwardly from the bracket to comprise a male feature. The pin or hook portion 122 is received within the recess 120 when the forward bracket 86' is in the correct orientation. The aft bracket 88 could be similarly configured to include these male and female features.

Figure 6:
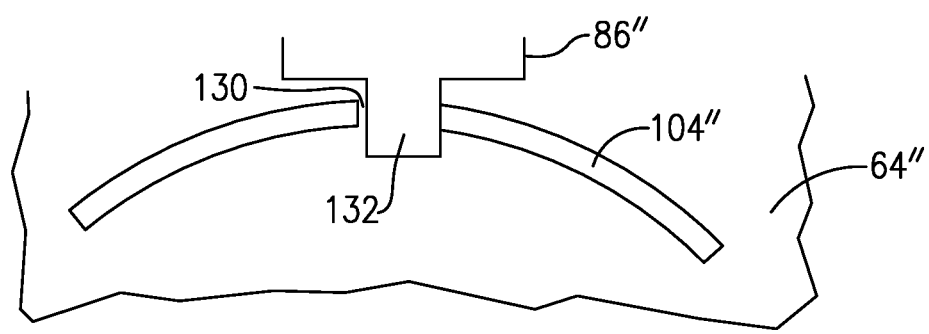
FIG. 6 is a schematic view of another alternate orientation feature.

FIG. 6 shows an example where the plate portion 64" includes an opening, slot, or recess 130 formed in the first rib 104" that comprises a female feature. A forward bracket 86" includes a tab portion 132 that extends outwardly from the bracket to comprise a male feature. The tab portion 132 is received within the recess 130 when the forward bracket 86" is in the correct orientation. The aft bracket 88 could be similarly configured to include these male and female features.

As discussed above, in the configuration shown in FIGS. 2-4, the ribs 104, 106 cooperate with the tab portions 96, 102 to ensure that the swirler tube 62 is only installed in one orientation relative to the mid-turbine frame 57. The attachment interface 84 of the forward bracket 86 is located on the mounting flange portion 90 and comprises at least one opening 140 configured to receive a fastener 142. In this example, there are a pair of openings 140 (only one can be seen) and an associated pair of fasteners 142, wherein the openings 140 are located on opposite sides of the center boss portion 92.

The attachment interface 84 on the aft bracket 88 is located on the mounting flange portion 98 and comprises at least one opening 144. In the example shown, there are a pair of openings 144 that are aligned with the openings 140 in the forward bracket 86. The plate portion 64, which is sandwiched between the forward 86 and aft 88 brackets, also includes a pair of openings 146 that are aligned with the openings 140, 144. The fasteners 142 comprise a single set of fasteners that are used to secure all three components together.

When properly installed, the mounting flange portions 90, 98 are generally flush with the respective forward 66 and aft 68 faces (FIG. 2). FIG. 3B shows an incorrect orientation of the forward bracket 86. The bracket 86 has been rotated 180 degrees from the correct orientation position. The tab portion 96 abuts against, or interferes with, the first rib 104 in this position which prevents the bracket 86 from sitting flush with the plate portion 64. As such, the installer can easily recognize that the bracket 86 is in the incorrect portion and can adjust the position accordingly.

FIG. 4 shows an incorrect orientation of the aft bracket 88. The bracket 88 has been rotated 180 degrees from the correct orientation position. The tab portion 102 abuts against, or interferes with, the second rib 106 in this position which prevents the bracket 88 from sitting flush with the plate portion 64. As such, the installer can easily recognize that the bracket 88 is in the incorrect portion and can adjust the position accordingly.

As such, the subject invention provides a mistake proof mounting configuration for a cooling structure such as a swirler tube, for example. This ensures that the entry of cooling air flow is in the correct direction, which is critical for providing the most effective cooling. If the flow enters in an incorrect direction, the temperature of the cooling air would be increased due to mixing and windage losses. If cooling air temperatures are increased due to windage, it can result in lower life for the rotor or a reduced burst margin. The subject invention thus avoids these problems.

Further, should be understood that while the bracket assembly 82 is shown as mounting a swirler tube to a mid-turbine frame 57, the bracket assembly 82 could be used with other gas turbine engine structures. For example, the bracket assembly 82 could be used to mount other types of cooling structures to direct cooling flow into any type of cooling cavity located throughout the gas turbine engine.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A method of installing a cooling structure in a gas turbine engine comprising:
   providing a mid-turbine frame that defines a cooling cavity and has an opening to define a portion of a cooling flowpath, and providing a cooling component that is configured to direct cooling flow into the cooling cavity, and wherein the mid-turbine frame has a plate portion with a forward face and an aft face;
   providing a bracket that supports the cooling component and has an attachment interface to fix the bracket to the mid-turbine frame, wherein the bracket comprises a forward bracket and an aft bracket, the forward bracket positioned on one side of the mid-turbine frame and having a first mounting flange portion with a center boss portion extending outwardly from the mounting flange portion, and the aft bracket positioned on an opposite side of the mid-turbine frame and having a second mounting flange portion;
   associating the cooling component with the aft bracket;
   associating an inlet tube with the center boss portion of the forward bracket to direct cooling flow through the opening and into the cooling component;
   forming a first orientation feature on the bracket;
   forming a second orientation feature on the mid-turbine frame; and
   associating the first and second orientation features with each other to ensure that the cooling component is only installed in one orientation relative to the mid-turbine frame by
   attaching the first mounting flange portion to the forward face, and
   attaching the second mounting flange portion to the aft face;

to provide a properly installed cooling component when the first and second mounting flange portions are flush with the respective forward and aft faces.

2. The method of claim 1, wherein one of the first and second orientation features comprises a male feature and the other of the first and second orientation features comprises a female feature, and
   wherein associating the first and second orientation features with each other comprises inserting the male feature into the female feature to achieve the one orientation.

3. The method of claim 2, wherein the male feature comprises a tab and the female feature comprises a slot.

4. The method of claim 2, wherein the male feature comprises a pin and the female feature comprises an opening.

5. The method of claim 1, wherein the first orientation feature comprises at least one tab and the second orientation feature comprises a rib.

6. The method of claim 1, wherein the cooling component comprises a swirler tube that initiates a swirling flow pattern about an engine central axis.

7. The method of claim 1, wherein the forward and aft brackets each include the first orientation feature.

8. The method of claim 1, wherein the cooling component comprises a swirler tube that redirects cooling flow from a first direction defined by the inlet tube to a second direction that is transverse to the first direction.

9. The method of claim 1, wherein the attachment interface includes at least one fastener that secures both the forward and aft brackets to the mid-turbine frame.

10. The method of claim 9, wherein the opening in the mid-turbine frame comprises a flow opening in the plate portion of the mid-turbine frame, and wherein the at least one fastener comprises at least a first fastener and a second fastener, and including aligning a center opening of the forward bracket with the flow opening in the plate portion of the mid-turbine frame, aligning a center opening of the aft bracket with the flow opening, and securing the forward and aft brackets to the mid-turbine frame by inserting the first fastener through aligned fastener openings in the forward bracket, aft bracket, and mid-turbine frame on one side of the flow opening, and inserting the second fastener through aligned fastening openings in the forward bracket, aft bracket, and mid-turbine frame on an opposite side of the flow opening.

* * * * *